UNITED STATES PATENT OFFICE.

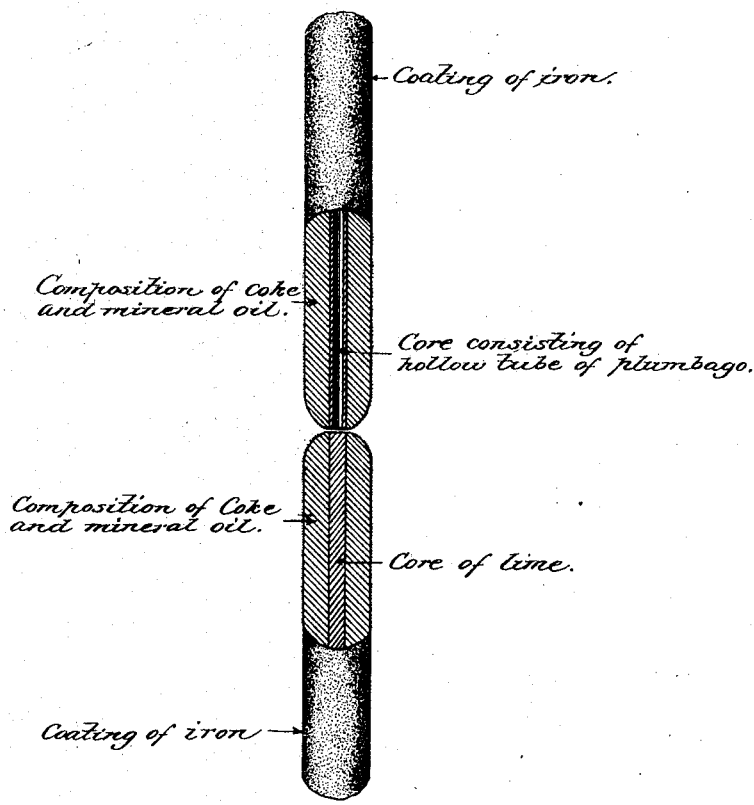

ROBERT McMANUS, OF BROOKLYN, NEW YORK.

CARBON FOR ELECTRIC-ARC LAMPS.

SPECIFICATION forming part of Letters Patent No. 504,815, dated September 12, 1893.

Application filed October 27, 1892. Serial No. 450,149. (No model.)

*To all whom it may concern:*

Be it known that I, ROBERT MCMANUS, of the city of Brooklyn, in the county of Kings and State of New York, have invented a new and useful Improvement in Carbons for Electrical Lighting and Heating Purposes; and I do hereby declare that the following is a full, clear, and exact description thereof, which will enable others skilled in the art to make and use the same.

This invention relates to carbons to be used in electric lighting and heating.

The object of my invention is to supply a carbon pencil or electrode to be used in any electric arc lamp or similar vessel; and is intended to be an improvement on my previous patent for carbons.

In the accompanying drawings Figure 1 is an elevation, partly in section and partly broken away, of a pair of carbons made in accordance with my invention. Fig. 2 is a transverse section of the upper carbon; and Fig. 3 is a similar view of the lower carbon.

My improved carbon pencil or electrode is made by combining, as in my previous patent, a volatile carbon made from mineral oils, their products or equivalents, with finely pulverized coke and a proportion of iron. The proportions of these ingredients which I have found most beneficial, are ninety-two (92) parts of coke, seven (7) parts of mineral oil, and one (1) part of iron. The lower carbon preferably has a core of lime, and the upper carbon preferably has a hollow tube of plumbago or graphite. I do not confine myself to these exact proportions. Nor do I confine myself to the core or center of lime in the lower carbon and the hollow plumbago tube in the upper as my invention contemplates the use of lime in the upper with the plumbago tube in the lower, as it may be desired to throw the light upward or downward.

My improved composition is prepared substantially as in my previous patent combining mineral oils, coke and iron.

In carrying out my improvement I bore out or cast the lower carbon so as to leave the center hollow to perhaps, say quarter of the width of the carbon. This I fill with lime so as to make a solid core of lime. The upper carbon I make hollow and insert a tube or other hollow structure made of plumbago through its entire length.

The carbons made with the above improvements will be found to give a white light of much greater intensity than any other form of carbon employed, and the use of the hollow tube of plumbago prevents any expansion outward so as to break the carbon, and at the same time serves as the best possible conductor of the electricity.

A carbon pencil or electrode made in accordance with my improved invention will burn from eight to twelve hours longer than any heretofore employed, and the light furnished will be many times greater than that of any other carbon.

What I claim as my invention, and desire to secure by Letters Patent, is—

1. A pair of carbon pencils, the one having a core of lime and the other a core of plumbago.

2. A pair of carbon pencils, the one having a core of lime and the other a hollow core of plumbago.

3. A pair of carbon pencils comprising coke and mineral oil in their composition, the one having a core of lime and the other a core of plumbago.

ROBERT McMANUS.

Witnesses:
DANIEL J. PHELAN,
JNO. T. PARKER.